United States Patent
Gu et al.

(10) Patent No.: US 10,552,971 B2
(45) Date of Patent: Feb. 4, 2020

(54) MEASUREMENT METHOD, AND TERMINAL

(71) Applicant: Huawei Technologies Co., Ltd., Shenzhen (CN)

(72) Inventors: Xinggang Gu, Shanghai (CN); Shaojun Chen, Shanghai (CN); Shisheng Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 186 days.

(21) Appl. No.: 15/561,287

(22) PCT Filed: May 15, 2015

(86) PCT No.: PCT/CN2015/079051
§ 371 (c)(1),
(2) Date: Sep. 25, 2017

(87) PCT Pub. No.: WO2016/183723
PCT Pub. Date: Nov. 24, 2016

(65) Prior Publication Data
US 2018/0130219 A1 May 10, 2018

(51) Int. Cl.
*G06T 7/593* (2017.01)
*G01B 11/02* (2006.01)

(52) U.S. Cl.
CPC .............. *G06T 7/593* (2017.01); *G01B 11/02* (2013.01); *G06T 2207/10012* (2013.01); *G06T 2207/10028* (2013.01); *G06T 2207/20101* (2013.01)

(58) Field of Classification Search
CPC . G06T 7/593; G06T 7/62; G06T 2207/10012; G06T 2207/10028; G06T 2207/20101; G01B 11/02
See application file for complete search history.

(56) References Cited

U.S. PATENT DOCUMENTS 5,361,117 A * 11/1994 Nonaka ............... G02B 7/32
250/201.4
2004/0019255 A1 1/2004 Sakiyama
(Continued)

FOREIGN PATENT DOCUMENTS

CN 103063138 A 4/2013
CN 103292710 A 9/2013
(Continued)

OTHER PUBLICATIONS

Wikipedia, "Euclidean distance," https://en.wikipedia.org/w/index.php?title=Euclidean_distance&oldid=653819107, Mar. 27, 2015, 2 pages.

*Primary Examiner* — Bobbak Safaipour
(74) *Attorney, Agent, or Firm* — Slater Matsil, LLP

(57) ABSTRACT

A method can measure the size of an object using a terminal having two cameras. The method includes obtaining, by a terminal using a first camera, a first image that includes a to-be-measured object, and obtaining, using a second camera, a second image that includes the to-be-measured object, where the first camera and the second camera are disposed in a same plane. The method also includes comparing locations of the to-be-measured object in the first image and in the second image, so as to obtain a total location offset of the to-be-measured object. Additionally, the method includes receiving a measurement point selection instruction entered by a user based on the first image, and calculating a distance between selected measurement points according to the total location offset, a distance between a center of the first camera and a center of the second camera, and a focal length of the first camera.

17 Claims, 4 Drawing Sheets

(56) References Cited

U.S. PATENT DOCUMENTS

| | | |
|---|---|---|
| 2005/0036046 A1 | 2/2005 | Atsum |
| 2009/0290786 A1 | 11/2009 | Stevens et al. |
| 2011/0249117 A1 | 10/2011 | Yoshihama et al. |
| 2012/0185167 A1* | 7/2012 | Higuchi ............. G01C 21/3602 |
| | | 701/461 |
| 2013/0331145 A1 | 12/2013 | Liao et al. |
| 2015/0062305 A1 | 3/2015 | Murayama et al. |
| 2015/0287196 A1* | 10/2015 | De Villiers ............. G06T 5/006 |
| | | 348/187 |
| 2015/0310619 A1 | 10/2015 | Cao |
| 2017/0343367 A1* | 11/2017 | Lee ........................ A61B 5/204 |
| 2018/0232897 A1* | 8/2018 | Masuda ................... G09G 5/14 |

FOREIGN PATENT DOCUMENTS

| | | |
|---|---|---|
| CN | 103344213 A | 10/2013 |
| CN | 104596419 A | 5/2015 |
| JP | H0518748 A | 1/1993 |
| JP | 2001275934 A | 10/2001 |
| JP | 2009222446 A | 10/2009 |
| JP | 2011232330 A | 11/2011 |
| JP | 2013113600 A | 6/2013 |
| WO | 2013146269 A1 | 10/2013 |
| WO | 2013174354 A2 | 11/2013 |

* cited by examiner

MEASUREMENT METHOD, AND TERMINAL

CROSS-REFERENCE TO RELATED APPLICATIONS

This application is a National Stage of International Application No. PCT/CN2015/079051, filed on May 15, 2015, which is hereby incorporated by reference in its entirety.

TECHNICAL FIELD

The present invention relates to the field of communications technologies, and in particular, to a measurement method and a terminal.

BACKGROUND

In daily life, a user usually needs to measure a distance or a length. For example, when purchasing furniture, a space of a house needs to be measured, and a length, a width, and a height of the furniture also need to be measured, so as to determine whether a size of the furniture matches the space of the house. To meet such measurement requirements, the user usually needs to purchase a length measurement tool such as a measuring tape, and carries the tool everywhere when needed. This brings great inconvenience. Once the user forgets to carry the tool, measurement cannot be performed, which causes a big headache. In addition, because of a limited length of such a tool, when a to-be-measured length exceeds a measuring range of the tool, multiple measurements need to be performed. This is inconvenient and leads to a relatively great error.

With rapid development and popularization of intelligent terminals such as a smart phone, a tablet computer, and a smartwatch, most users have terminals with a camera, and some of the terminals are provided with two cameras. In the prior art, a distance from a to-be-measured object to a terminal may be measured based on the two cameras; however, a size of the to-be-measured object cannot be measured.

SUMMARY

To resolve the foregoing technical problem, embodiments of the present invention provide a measurement method and a terminal, so as to resolve the problem that the terminal cannot measure a size of a to-be-measured object.

According to a first aspect, an embodiment of the present invention provides a measurement method, including: obtaining, by a terminal by using a first camera, a first image that includes a to-be-measured object, and obtaining, by using a second camera, a second image that includes the to-be-measured object, where the first camera and the second camera are disposed in a same plane; comparing locations of the to-be-measured object in the first image and in the second image, so as to obtain a total location offset of the to-be-measured object, where the total location offset is used to represent an offset of the location of the to-be-measured object in the first image relative to the location of the to-be-measured object in the second image; and receiving a measurement point selection instruction entered by a user based on the first image, and calculating a distance between selected measurement points according to the total location offset, a distance between a center of the first camera and a center of the second camera, and a focal length of the first camera.

With reference to the first aspect, in a first possible implementation manner of the first aspect, after the comparing locations of the to-be-measured object in the first image and in the second image, so as to obtain a total location offset of the to-be-measured object. The method further includes compressing imaging data of the first image and the total location offset, and storing the imaging data of the first image and the total location offset that are compressed as an image file. The method also includes before the receiving a measurement point selection instruction entered by a user based on the first image, the method further includes. Additionally, the method includes parsing the image file, so as to obtain the imaging data of the first image and the total location offset and decoding the imaging data, so as to display the first image on a screen of the terminal.

With reference to the first aspect or the first possible implementation manner of the first aspect, in a second possible implementation manner of the first aspect, after the calculating a distance between selected measurement points, the method further includes: displaying, on the screen of the terminal, a distance result obtained by means of calculation; or notifying, by means of voice, a user of a distance result obtained by means of calculation.

With reference to any one of the first aspect, or the first to the second possible implementation manners of the first aspect, in a third possible implementation manner of the first aspect, the comparing locations of the to-be-measured object in the first image and in the second image, so as to obtain a total location offset of the to-be-measured object is implemented by means of calculation according to the following formula:

$$D = X_1 + X_2,$$

where D is the total location offset of the to-be-measured object; $X_1$ is a location offset component of the to-be-measured object in the first image; and $X_2$ is a location offset component of the to-be-measured object in the second image.

With reference to any one of the first aspect, or the first to the third possible implementation manners of the first aspect, in a fourth possible implementation manner of the first aspect, the receiving a measurement point selection instruction entered by a user based on the first image, and calculating a distance between selected measurement points according to the total location offset, a distance between a center of the first camera and a center of the second camera, and a focal length of the first camera is performed by using the following formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where L is the distance between the selected measurement points; $(X_p, Y_p)$ are coordinates of a measurement point p in the first image; $D_p$ is a total location offset of the measurement point P; $(X_q, Y_q)$ are coordinates of a measurement point q in the first image; $D_q$ is a total location offset of the measurement point q; and $H_1 = h_1/a$, where $h_1$ is the focal length of the first camera, and a is a size constant of a single pixel.

With reference to any one of the first aspect, or the first to the fourth possible implementation manners of the first aspect, in a fifth possible implementation manner of the first aspect, the method further includes: calculating a vertical distance from the to-be-measured object to a line connecting the centers of the first camera and the second camera by using the following formula:

$$Z=H_1 \cdot D_1/(X_1+X_2),$$

where Z is the vertical distance from the to-be-measured object to the line connecting the centers of the first camera and the second camera; $H_1=h_1/a$, where $h_1$ is the focal length of the first camera, and a is the size constant of a single pixel; $D_1$ is the distance between the center of the first camera and the center of the second camera; $X_1$ is the location offset component of the to-be-measured object in the first image; and $X_2$ is the location offset component of the to-be-measured object in the second image.

With reference to any one of the first aspect, or the first to the fifth possible implementation manners of the first aspect, in a sixth possible implementation manner of the first aspect, the method includes: if a user selects two measurement points, calculating a distance between the two measurement points; if a user selects more than two measurement points, successively calculating distances between every two neighboring measurement points according to a selection order.

According to a second aspect, an embodiment of the present invention provides a terminal, including: an obtaining unit, configured to obtain, by using a first camera, a first image that includes a to-be-measured object, and obtain, by using a second camera, a second image that includes the to-be-measured object, where the first camera and the second camera are disposed in a same plane. The terminal also includes a comparison unit, configured to compare locations of the to-be-measured object in the first image and in the second image, so as to obtain a total location offset of the to-be-measured object, where the total location offset is used to represent an offset of the location of the to-be-measured object in the first image relative to the location of the to-be-measured object in the second image. Additionally, the terminal includes a calculation unit, configured to receive a measurement point selection instruction entered by a user based on the first image, and calculate a distance between selected measurement points according to the total location offset, a distance between a center of the first camera and a center of the second camera, and a focal length of the first camera.

With reference to the implementation manner of the second aspect, in a first possible implementation manner of the second aspect, the terminal further includes: a compression unit, configured to: compress imaging data of the first image and the total location offset, and store the imaging data of the first image and the total location offset that are compressed as an image file; a parsing unit, configured to parse the image file, so as to obtain the imaging data of the first image and the total location offset; and a decoding unit, configured to decode the imaging data, so as to display the first image on a screen of the terminal.

With reference to the second aspect, or the first possible implementation manner of the second aspect, in a second possible implementation manner of the second aspect, the terminal further includes: a notification unit, configured to: display, on the screen of the terminal, a distance result obtained by means of calculation; or notify, by means of voice, a user of a distance result obtained by means of calculation.

With reference to any one of the second aspect, or the first to the second possible implementation manners of the second aspect, in a third possible implementation manner of the second aspect, the comparison unit is specifically configured to compare the locations of the to-be-measured object in the first image and in the second image by using the following formula, so as to obtain the total location offset of the to-be-measured object:

$$D=X_1+X_2,$$

where D is the total location offset of the to-be-measured object; $X_1$ is a location offset component of the to-be-measured object in the first image; and $X_2$ is a location offset component of the to-be-measured object in the second image.

With reference to any one of the second aspect, or the first to the third possible implementation manners of the second aspect, in a fourth possible implementation manner of the second aspect, the calculation unit is specifically configured to calculate the distance between the selected measurement points by using the following formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where L is the distance between the selected measurement points; $(X_p, Y_p)$ are coordinates of a measurement point p in the first image; $D_p$ is a total location offset of the measurement point P; $(X_q, Y_q)$ are coordinates of a measurement point q in the first image; $D_q$ is a total location offset of the measurement point q; and $H_1=h_1/a$, where $h_1$ is the focal length of the first camera, and a is a size constant of a single pixel.

With reference to any one of the second aspect, or the first to the fourth possible implementation manners of the second aspect, in a fifth possible implementation manner of the second aspect, the calculation unit is further configured to calculate a vertical distance from the to-be-measured object to a line connecting the centers of the first camera and the second camera by using the following formula:

$$Z=H_1 \cdot D_1/(X_1+X_2),$$

where Z is the vertical distance from the to-be-measured object to the line connecting the centers of the first camera and the second camera; $H_1=h_1/a$, where $h_1$ is the focal length of the first camera, and a is the size constant of a single pixel; $D_1$ is the distance between the center of the first camera and the center of the second camera; $X_1$ is the location offset component of the to-be-measured object in the first image; and $X_2$ is the location offset component of the to-be-measured object in the second image.

With reference to any one of the second aspect, or the first to the fifth possible implementation manners of the second aspect, in a sixth possible implementation manner of the second aspect, the calculation unit is specifically configured to: if a user selects two measurement points, calculate a distance between the two measurement points; if a user selects more than two measurement points, successively calculate distances between every two neighboring measurement points according to a selection order.

According to a third aspect, an embodiment of the present invention provides a terminal, including: an input device, an output device, a memory, and a processor, where the input device includes a first camera and a second camera, configured to obtain images of a to-be-measured object; the input device, the output device, the memory, and the processor are connected to a bus, where the memory stores a set of program code; and the processor is configured to invoke the program code stored in the memory to perform the following operations: obtaining, by using the first camera, a first image that includes the to-be-measured object, and obtaining, by using the second camera, a second image that includes the to-be-measured object, where the first camera and the second camera are disposed in a same plane; comparing locations of the to-be-measured object in the first image and in the second image, so as to obtain a total location offset of the to-be-measured object, where the total location offset is used to represent an offset of the location of the to-be-measured object in the first image relative to the location of the to-be-measured object in the second image; and receiving a measurement point selection instruction entered by a user based on the first image, and calculating a distance between selected measurement points according to the total location offset, a distance between a center of the first camera and a center of the second camera, and a focal length of the first camera.

With reference to the implementation manner of the third aspect, in a first possible implementation manner of the third aspect, the processor is further configured to: after the obtaining a total location offset of the to-be-measured object, compress imaging data of the first image and the total location offset, and store the imaging data of the first image and the total location offset that are compressed as an image file; before the receiving a measurement point selection instruction entered by a user based on the first image, parse the image file, so as to obtain the imaging data of the first image and the total location offset; and decode the imaging data, so as to display the first image on a screen of the terminal.

With reference to the third aspect, or the first possible implementation manner of the third aspect, in a second possible implementation manner of the third aspect, the output device is configured to: after the calculating a distance between selected measurement points, display, on the screen of the terminal, a distance result obtained by means of calculation; or notify, by means of voice, a user of a distance result obtained by means of calculation.

With reference to any one of the third aspect, or the first to the second possible implementation manners of the third aspect, in a third possible implementation manner of the third aspect, the processor is specifically configured to compare the locations of the to-be-measured object in the first image and in the second image by using the following formula, so as to obtain the total location offset of the to-be-measured object:

$$D = X_1 + X_2,$$

where D is the total location offset of the to-be-measured object; $X_1$ is a location offset component of the to-be-measured object in the first image; and $X_2$ is a location offset component of the to-be-measured object in the second image.

With reference to any one of the third aspect, or the first to the third possible implementation manners of the third aspect, in a fourth possible implementation manner of the third aspect, the processor is specifically configured to calculate the distance between the selected measurement points by using the following formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where L is the distance between the selected measurement points; $(X_p, Y_p)$ are coordinates of a measurement point p in the first image; $D_p$ is a total location offset of the measurement point P; $(X_q, Y_q)$ are coordinates of a measurement point q in the first image; $D_q$ is a total location offset of the measurement point q; and $H_1 = h_1/a$, where $h_1$ is the focal length of the first camera, and a is a size constant of a single pixel.

With reference to any one of the third aspect, or the first to the fourth possible implementation manners of the third aspect, in a fifth possible implementation manner of the third aspect, the processor is further configured to calculate a vertical distance from the to-be-measured object to a line connecting the centers of the first camera and the second camera by using the following formula:

$$Z = H_1 * D_1 / (X_1 + X_2),$$

where Z is the vertical distance from the to-be-measured object to the line connecting the centers of the first camera and the second camera; $H_1 = h_1/a$, where $h_1$ is the focal length of the first camera, and a is the size constant of a single pixel; $D_1$ is the distance between the center of the first camera and the center of the second camera; $X_1$ is the location offset component of the to-be-measured object in the first image; and $X_2$ is the location offset component of the to-be-measured object in the second image.

With reference to any one of the third aspect, or the first to the fifth possible implementation manners of the third aspect, in a sixth possible implementation manner of the third aspect, when calculating the distance between the selected measurement points, the processor is specifically configured to: if a user selects two measurement points, calculate a distance between the two measurement points; if a user selects more than two measurement points, successively calculate distances between every two neighboring measurement points according to a selection order.

According to a fourth aspect, an embodiment of the present invention provides a computer storage medium, where the computer storage medium stores a program; and when being executed, the program includes the steps described in any one of a first aspect of the embodiments of the present invention or implementation manners of the first aspect.

The following beneficial effects are achieved by implementing the embodiments of the present invention.

A first image and a second image that are of a to-be-measured object are obtained by using two cameras, and a total location offset of the to-be-measured object is obtained by means of comparison and calculation. When selecting measurement points between which a distance is to be measured, a user may obtain the distance between the selected measurement points by means of calculation according to the total location offset, a distance between a center of the first camera and a center of the second camera, and a focal length of the first camera. To measure a size of the to-be-measured object, the user does not need to carry any extra measurement tool, and only needs to carry a terminal for photographing, thereby enriching functions of a terminal, and enhancing practicability and convenience of the terminal.

BRIEF DESCRIPTION OF THE DRAWINGS

To describe the technical solutions in the embodiments of the present invention the prior art more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

A terminal in the embodiments of the present invention may include a smart phone having a dual-camera photographing function (such as an Android™ phone, an iOS™ phone, or a Windows™ Phone phone), a tablet computer, a digital camera, a palmtop computer, a laptop computer, a mobile Internet device (mobile internet device, MID for short), a wearable device, or the like. The foregoing terminals are merely examples instead of being exhaustive. The terminal in the embodiments of the present invention includes but is not limited to the foregoing terminals.

Figure 1:
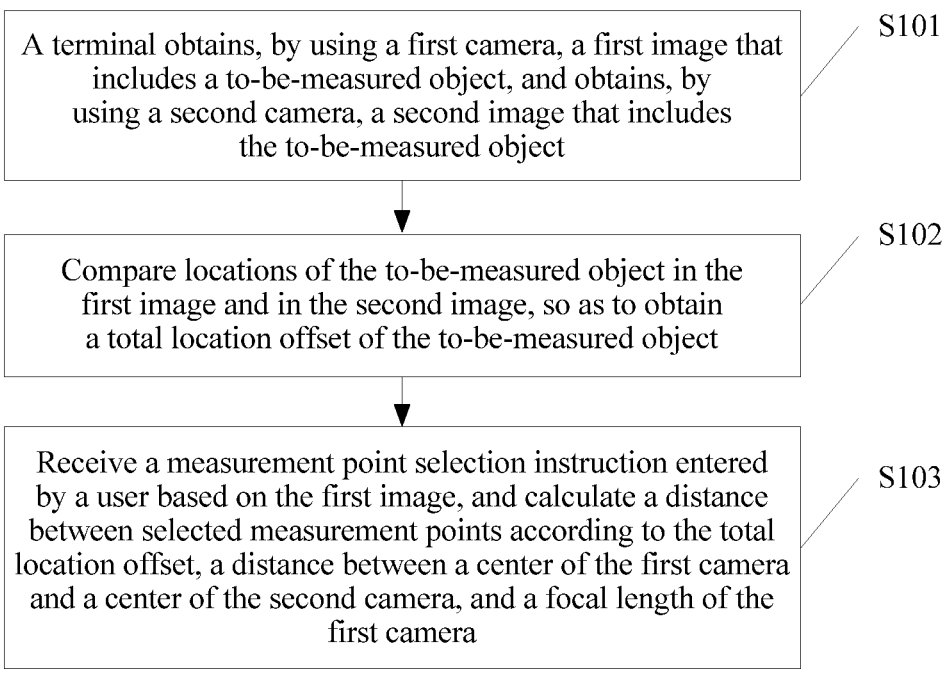
FIG. 1 is a schematic flowchart of a first embodiment of a measurement method according to the present invention.

Referring to FIG. 1, FIG. 1 is a schematic flowchart of a first embodiment of a measurement method according to the present invention. In this embodiment, the method includes the following steps.

S101. A terminal obtains, by using a first camera, a first image that includes a to-be-measured object, and obtains, by using a second camera, a second image that includes the to-be-measured object.

The first camera and the second camera are disposed in a same plane.

Optionally, in some feasible implementation manners, when obtaining images by using two cameras, a terminal may trigger photographing according to an operation of a terminal user. For example, the terminal user taps a photographing button of a camera application, or presses a specific physical button or a combination of multiple physical buttons, or enters a section of voice (such as "photograph" or "measure"), or makes a preset gesture to the terminal to trigger photographing. This is not limited in the embodiment of the present invention.

In addition, the terminal may have two, three, or more cameras. It is only required to ensure that images obtained by at least two cameras include the to-be-measured object. In the two cameras, one may be set as a primary camera and the other may be set as a secondary camera, and the primary-secondary relationship may be freely switched. During subsequent image storing, an image photographed by the primary camera is stored. During calculation of various data, the calculation is preformed based on a parameter of the primary camera that provides the image.

During obtaining of the first image and the second image, the first image and the second image may be obtained at the same time or successively obtained at a short time interval. A location of the terminal is kept unchanged as much as possible during photographing, so as to obtain a first image and a second image with a maximum correlation. If locations of the terminal during the first photographing and during the second photographing are kept unchanged, the first image and the second image may be obtained at any time interval.

S102. Compare locations of the to-be-measured object in the first image and in the second image, so as to obtain a total location offset of the to-be-measured object.

The total location offset is used to represent an offset of the location of the to-be-measured object in the first image relative to the location of the to-be-measured object in the second image. Because the two reference locations are distributed in two images, during specific calculation, an intermediate reference location, such as a center line of an image, may be introduced to make a comparison. Optionally, the total location offset may be obtained by means of calculation according to a location offset component of the to-be-measured object in the first image and a location offset component of the to-be-measured object in the second image. Either of the location offset components is a distance from a location of the to-be-measured object in a corresponding image to a center line of the image, and the center line of the image is perpendicular to a line connecting a center of the first camera and a center of the second camera.

Figure 6:
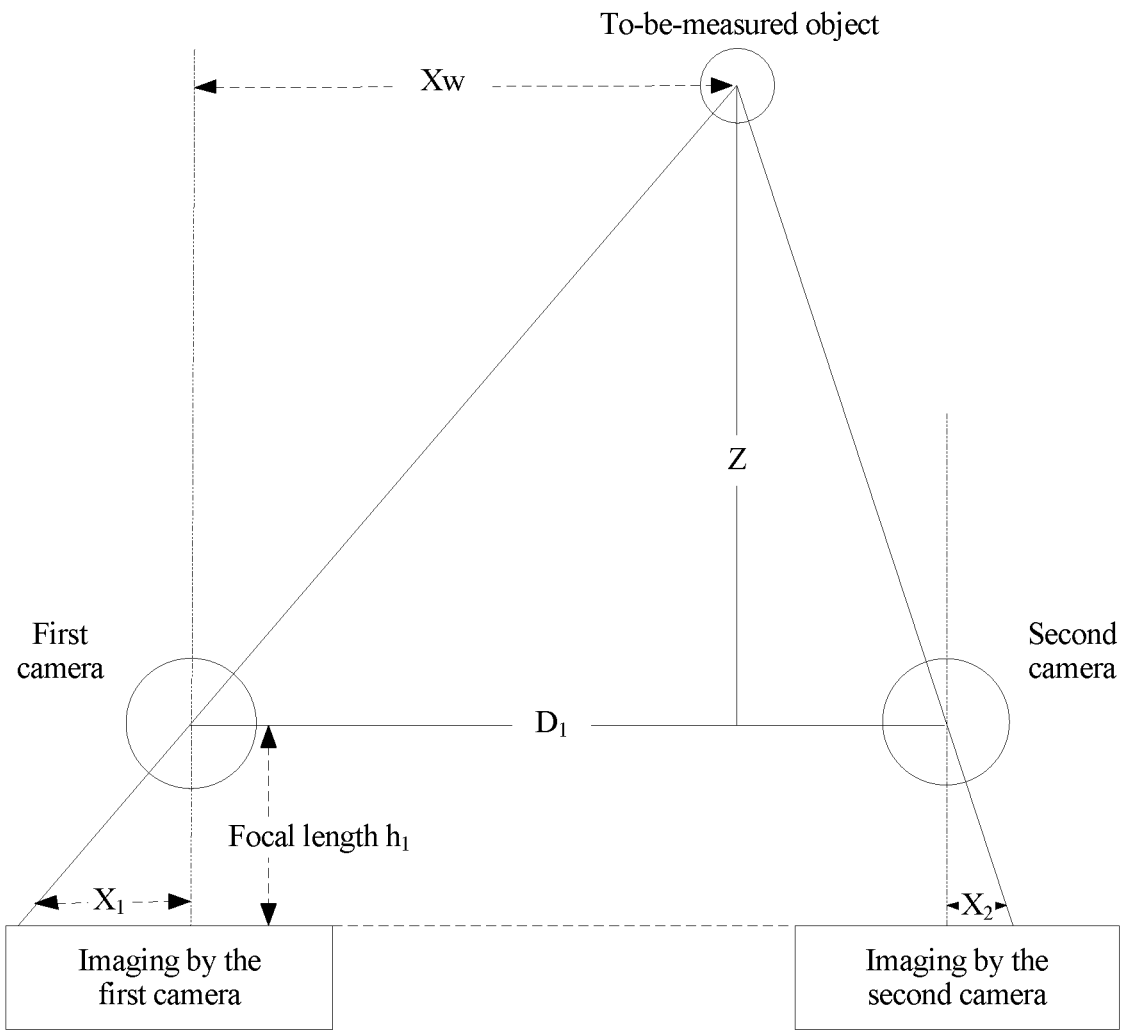
FIG. 6 is a schematic diagram of a principle of calculating a distance according to the present invention.

For example, refer to FIG. 6. If the terminal includes two cameras: a left camera and a right camera, and the two cameras are horizontally disposed, during photographing, the left camera obtains a first image, and the to-be-measured object in the first image generally has a leftward offset. If a center line of the first image in a vertical direction is used as a reference, that is, if a center line that is perpendicular to a line connecting the centers of the two cameras is used as a reference, a location offset component of the to-be-measured object in the first image may be obtained. Likewise, in a second image, a location offset component of the to-be-measured object in the second image may be obtained. Because the two cameras are horizontally disposed, for a pixel, vertical coordinates of the pixel in a coordinate system are same. Therefore, there is no offset in a vertical direction, and a total location offset is a sum of the two location offset components in a horizontal direction. Likewise, when the two cameras are vertically disposed, only location offset components and a total location offset that are in a vertical direction need to be considered.

Optionally, the location offset component of the to-be-measured object in the first image may be first obtained, then the location offset component of the to-be-measured object in the second image may be obtained, and then the total location offset of the to-be-measured object may be calculated by using the following formula:

$$D = X_1 + X_2,$$

where D is the total location offset of the to-be-measured object; $X_1$ is the location offset component of the to-bemeasured object in the first image; and $X_2$ is the location offset component of the to-be-measured object in the second image.

S103. Receive a measurement point selection instruction entered by a user based on the first image, and calculate a distance between selected measurement points according to the total location offset, a distance between a center of the first camera and a center of the second camera, and a focal length of the first camera.

When obtaining the total location offset, the terminal may prompt the user to select the measurement points based on the first image. In this case, the first image is an image that is photographed by the primary camera, that is, the first camera, and that is stored by the terminal. Based on the first image, the user may select an edge point of the to-be-measured object as a first measurement point, and then select a second location of the to-be-measured object as a second measurement point. For example, when a size of a wardrobe in an image needs to be measured, an upper edge of the wardrobe may be first selected as a first measurement point, and then a lower edge that is perpendicular to the upper edge is used as a second measurement point. In this case, the terminal may calculate a distance between the two measurement points according to the total location offset, the distance between the centers of the two cameras, and the focal length of the first camera. In this embodiment of the present invention, it may be understood that the distance between the center of the first camera and the center of second camera may include a distance between the first camera and the second camera, include a distance between a lens of the first camera and a lens of the second camera, include a distance between an image sensor of the first camera and an image sensor of the second camera, or include the lens of the first camera and the image sensor of the second camera. Optionally, a distance between a photosensitive device of the first camera and any device including an edge of the second camera may be further included. This is not limited.

It should be noted that, in the embodiment of the present invention, there may be two or more measurement points. If a user selects two measurement points, a distance between the two measurement points is measured. If a user selects more than two measurement points, distances between every two neighboring measurement points are successively calculated according to a selection order. For example, when a length and a width that are of a wardrobe need to be measured, an upper left edge of the wardrobe may be first selected as a first measurement point, then a lower left edge of the wardrobe is used as a second measurement point, and then a lower right edge of the wardrobe may be selected as a third measurement point. The terminal first calculates the length of the wardrobe according to the first measurement point and the second measurement point, and then calculates the width of the wardrobe according to the second measurement point and the third measurement point. Certainly, a resetting button or a re-measuring button may further be set for selection by a user. When a user selects resetting or re-measuring, all originally selected measurement points become invalid.

Optionally, the distance between the selected measurement points may be calculated by using the following formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where L is the distance between the selected measurement points; $(X_p, Y_p)$ are coordinates of a measurement point p in the first image; $D_p$ is a total location offset of the measurement point P; $(X_q, Y_q)$ are coordinates of a measurement point q in the first image; $D_q$ is a total location offset of the measurement point q; and $H_1 = h_1/a$, where $h_1/a$, is the focal length of the first camera, and a is a size constant of a single pixel.

$D_1$, a, $h_1$ are all known quantities. When measurement points are selected, values of $(X_p, Y_p)$, $(X_q, Y_q)$ may be obtained, and values of $D_p$ and $D_q$ may be obtained by performing step S102, and then a distance between the point p and the point q may be calculated by using the foregoing formula.

For derivation of the calculation formula of L, refer to FIG. 6, FIG. 6 is a schematic diagram of a principle of calculating a distance according to the present invention.

As shown in FIG. 6, a location offset component obtained after the to-be-measured object is imaged by using the first camera is $X_1$; a location offset component obtained after the to-be-measured object is imaged by using the second camera is $X_2$; a distance between the center of the first camera and the center of the second camera is $D_1$; a distance from the center of the to-be-measured object to the line connecting the centers of the two cameras is Z; and a distance from the center of the to-be-measured object to an extended center line of the first camera is $X_W$.

For a pixel in the first image, such as a point $X_1$ on the edge, if coordinates of the point $X_1$ are $(x_1, y_1)$, an absolute length of the point $X_1$ in the direction of the x-axis is $x_1$.

According to the triangle similarity theorem, it may be obtained that $x_1/X_w = h_1/Z$. Similar to the horizontal coordinate, in the direction of the y-axis, it may be obtained that $y_1/Y_w = h_1/Z$, so that it may be obtained that $X_w = x_1 * D_1/D$ and $Y_w = y_1 * D_1/D$.

Therefore, for the two measurement points, the point p and the point q, of the to-be-measured object, the distance between the point p and the point q is equal to a Euclidean length between space coordinates of the two measurement points. According to the Euclidean formula, it may be obtained that:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where $H_1 = h_1/a$, $h_1$ is the focal length of the first camera, and a is a size constant of a single pixel. A measurement unit of the distance $D_1$ between the center of the first camera and the center of the second camera is a universal length measurement unit, and lengths of $D_p$ and $D_q$ are calculated based on a quantity of pixels in the image. Therefore, units in the formula may be unified by introducing the constant a, and a unit of L finally obtained is a length measurement unit frequently used by a user.

Certainly, in this embodiment of the present invention, in addition to calculating a size of the to-be-measured object, a vertical distance from the to-be-measured object to the terminal, that is, to the line connecting the centers of the two cameras on the terminal, may be calculated. Specific calculation is also based on the triangle similarity theorem. As shown in FIG. 6, it may be obtained that $(D_1 - X_1 - X_2)/D_1 = (Z - H_1)/Z$, and it may be further derived that:

$$Z = H_1 * D_1/(X_1 + X_2).$$

Z may be quickly obtained by means of calculation according to this formula.

When the second image photographed based on the second camera is used as a reference for calculation, it is only required to obtain a focal length $h_2$ of the second camera, and replace $h_1$ with $h_2$. The remaining calculation method is similar. Details are not described herein again.

A first image and a second image that are of a to-be-measured object are obtained by using two cameras, and a total location offset of the to-be-measured object is obtained by means of comparison and calculation. When selecting measurement points between which a distance is to be measured, a user may obtain the distance between the selected measurement points by means of calculation according to the total location offset, a distance between a center of the first camera and a center of the second camera, and a focal length of the first camera. To measure a size of the to-be-measured object, the user does not need to carry any extra measurement tool, and only needs to carry a terminal for photographing, thereby enriching functions of a terminal, and enhancing practicability and convenience of the terminal.

Figure 2:
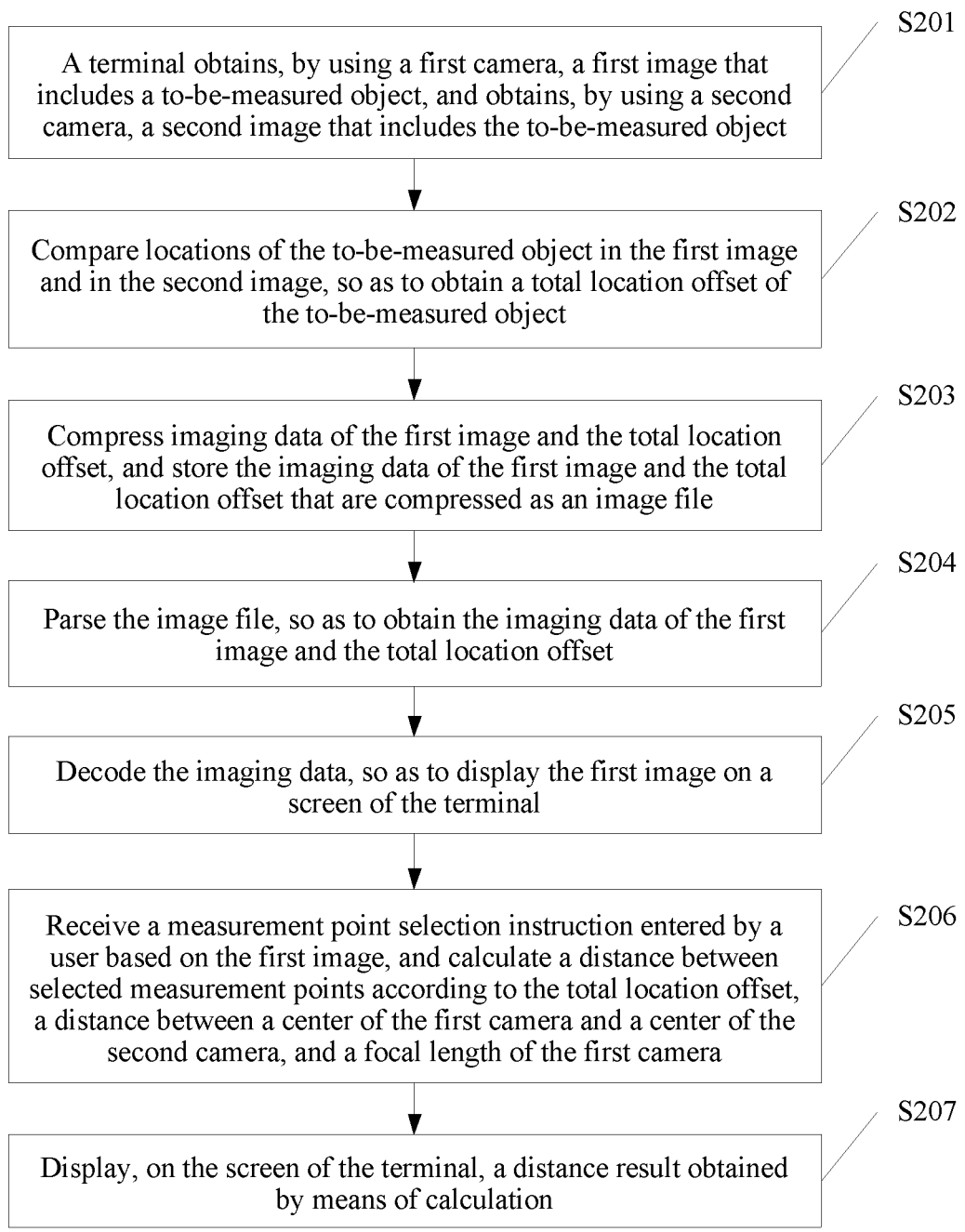
FIG. 2 is a schematic flowchart of a second embodiment of a measurement method according to the present invention.

Referring to FIG. 2, FIG. 2 is a schematic flowchart of a second embodiment of a measurement method according to the present invention. In this embodiment, the method includes the following steps.

S201. A terminal obtains, by using a first camera, a first image that includes a to-be-measured object, and obtains, by using a second camera, a second image that includes the to-be-measured object.

The first camera and the second camera are disposed in a same plane.

S202. Compare locations of the to-be-measured object in the first image and in the second image, so as to obtain a total location offset of the to-be-measured object.

The total location offset is used to represent an offset of the location of the to-be-measured object in the first image relative to the location of the to-be-measured object in the second image.

S203. Compress imaging data of the first image and the total location offset, and store the imaging data of the first image and the total location offset that are compressed as an image file.

After obtaining the total location offset, a user may not need to measure a size at once. In this case, the user may compress the imaging data of the first image and the total location offset, and store the imaging data of the first image and the total location offset that are compressed as an image file, so that the user can perform measurement at any time. In addition to the manner of compressing and storing the imaging data and the total location offset, certainly, the imaging data and the total location offset may be independently stored and configured with a specific mapping relationship. When viewing the first image and needing to measure a related distance, a user may invoke a corresponding total location offset at any time to perform calculation.

S204. Parse the image file, so as to obtain the imaging data of the first image and the total location offset.

S205. Decode the imaging data, so as to display the first image on a screen of the terminal.

Displaying the first image on the screen of the terminal allows a user to intuitively view the image and more conveniently select a measurement point.

S206. Receive a measurement point selection instruction entered by a user based on the first image, and calculate a distance between selected measurement points according to the total location offset, a distance between a center of the first camera and a center of the second camera, and a focal length of the first camera.

S207. Display, on the screen of the terminal, a distance result obtained by means of calculation.

Optionally, in addition to the manner of intuitively displaying the result on the screen so as to notify a user of the calculation result, the user may be notified, by means of voice, of the distance result obtained by means of calculation. There may be multiple notification manners. A user may perform selection or combination according to a requirement of the user, for example, the user may select a manner of text displaying and voice broadcast. This is not limited in the embodiment of the present invention.

For a calculation manner in this embodiment, refer to the calculation manner of the first embodiment shown in FIG. 1. Details are not described herein again.

An embodiment of the present invention further provides a computer storage medium, where the computer storage medium stores a program; and when being executed, the program includes some or all of the steps in the measurement methods described in the foregoing method embodiments.

Figure 3:
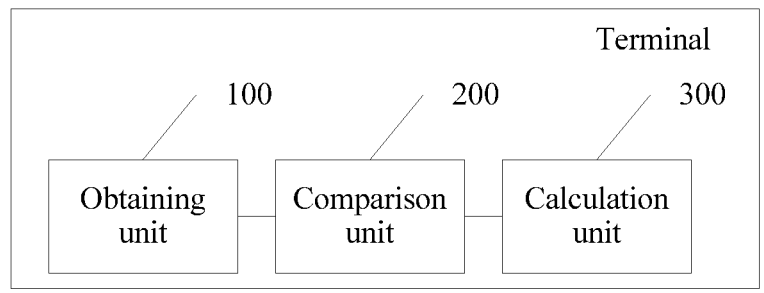
FIG. 3 is a schematic diagram of composition of a first embodiment of a terminal according to the present invention.

Referring to FIG. 3, FIG. 3 is a schematic diagram of composition of a first embodiment of a terminal according to the present invention. In this embodiment, the terminal includes: an obtaining unit 100, configured to: obtain, by using a first camera, a first image that includes a to-be-measured object, and obtain, by using a second camera, a second image that includes the to-be-measured object, where the first camera and the second camera are disposed in a same plane; a comparison unit 200, configured to compare locations of the to-be-measured object in the first image and in the second image, so as to obtain a total location offset of the to-be-measured object, where: the total location offset is used to represent an offset of the location of the to-be-measured object in the first image relative to the location of the to-be-measured object in the second image; and the total location offset may be obtained by means of calculation according to a location offset component of the to-be-measured object in the first image and a location offset component of the to-be-measured object in the second image, where either of the location offset components is a distance from a location of the to-be-measured object in a corresponding image to a center line of the image, and the center line of the image is perpendicular to a line connecting a center of the first camera and a center of the second camera; and a calculation unit 300, configured to: receive a measurement point selection instruction entered by a user based on the first image, and calculate a distance between selected measurement points according to the total location offset, a distance between the center of the first camera and the center of the second camera, and a focal length of the first camera.

Optionally, the comparison unit 200 is specifically configured to compare the locations of the to-be-measured object in the first image and in the second image by using the following formula, so as to obtain the total location offset of the to-be-measured object:

$$D = X_1 + X_2$$

where D is the total location offset of the to-be-measured object; $X_1$ is the location offset component of the to-be-measured object in the first image; and $X_2$ is the location offset component of the to-be-measured object in the second image.

Optionally, the calculation unit 300 is specifically configured to calculate the distance between the selected measurement points by using the following formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where L is the distance between the selected measurement points; $(X_p, Y_p)$ are coordinates of a measurement point p in the first image; $D_p$ is a total location offset of the measurement point p; $(X_q, Y_q)$ are coordinates of a measurement point q in the first image; $D_q$ is a total location offset of the measurement point q; and $H_1 = h_1/a$, where $h_1$ is the focal length of the first camera, and a is a size constant of a single pixel.

Optionally, the calculation unit 300 may be further configured to calculate a vertical distance from the to-be-measured object to a line connecting the centers of the first camera and the second camera by using the following formula:

$$Z = H_1 * D_1 / (X_1 + X_2),$$

where Z is the vertical distance from the to-be-measured object to the line connecting the centers of the first camera and the second camera; $H_1 = h_1/a$, where $h_1$ is the focal length of the first camera, and a is the size constant of a single pixel; $D_1$ is the distance between the center of the first camera and the center of the second camera; $X_1$ is the location offset component of the to-be-measured object in the first image; and $X_2$ is the location offset component of the to-be-measured object in the second image.

Figure 4:
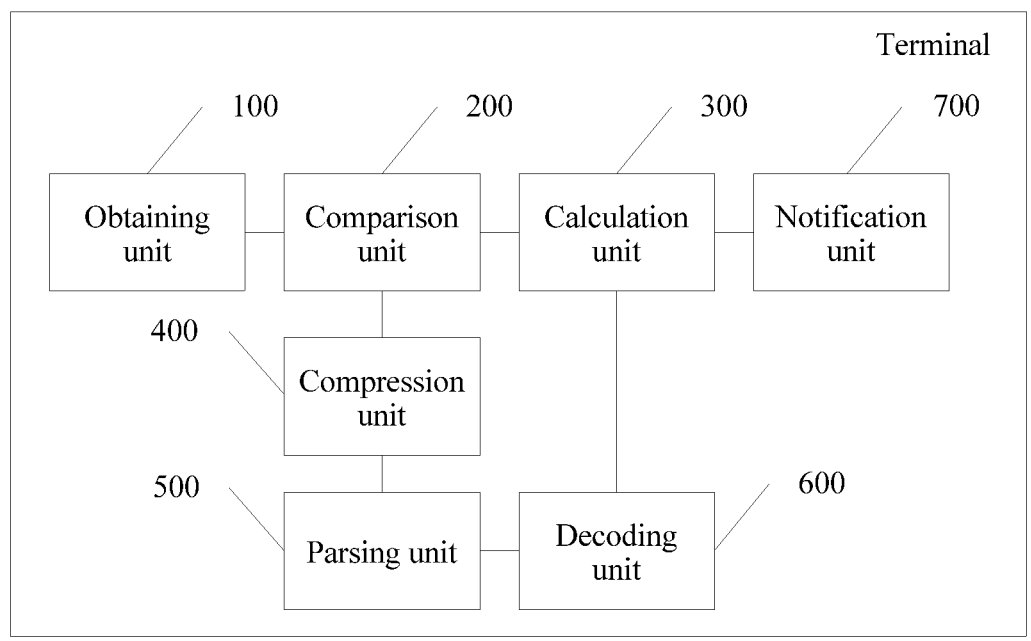
FIG. 4 is a schematic diagram of composition of a second embodiment of a terminal according to the present invention.

Referring to FIG. 4, FIG. 4 is a schematic diagram of composition of a second embodiment of a terminal according to the present invention. In this embodiment, the terminal includes: an obtaining unit 100, configured to: obtain, by using a first camera, a first image that includes a to-be-measured object, and obtain, by using a second camera, a second image that includes the to-be-measured object, where the first camera and the second camera are disposed in a same plane; a comparison unit 200, configured to compare locations of the to-be-measured object in the first image and in the second image, so as to obtain a total location offset of the to-be-measured object, where: the total location offset is used to represent an offset of the location of the to-be-measured object in the first image relative to the location of the to-be-measured object in the second image; and the total location offset may be obtained by means of calculation according to a location offset component of the to-be-measured object in the first image and a location offset component of the to-be-measured object in the second image, where either of the location offset components is a distance from a location of the to-be-measured object in a corresponding image to a center line of the image, and the center line of the image is perpendicular to a line connecting a center of the first camera and a center of the second camera; and a calculation unit 300, configured to: receive a measurement point selection instruction entered by a user based on the first image, and calculate a distance between selected measurement points according to the total location offset, a distance between the center of the first camera and the center of the second camera, and a focal length of the first camera.

Optionally, the comparison unit 200 is specifically configured to compare the locations of the to-be-measured object in the first image and in the second image by using the following formula, so as to obtain the total location offset of the to-be-measured object:

$$D = X_1 + X_2,$$

where D is the total location offset of the to-be-measured object; $X_1$ is the location offset component of the to-be-measured object in the first image; and $X_2$ is the location offset component of the to-be-measured object in the second image.

Optionally, the calculation unit 300 is specifically configured to calculate the distance between the selected measurement points by using the following formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where L is the distance between the selected measurement points; $(X_p, Y_p)$ are coordinates of a measurement point p in the first image; $D_p$ is a total location offset of the measurement point p; $(X_q, Y_q)$ are coordinates of a measurement point q in the first image; $D_q$ is a total location offset of the measurement point q; and $H_1 = h_1/a$, where $h_1$ is the focal length of the first camera, and a is a size constant of a single pixel.

Optionally, the calculation unit 300 may be further configured to calculate a vertical distance from the to-be-measured object to a line connecting the centers of the first camera and the second camera by using the following formula:

$$Z = H_1 * D_1 / (X_1 + X_2),$$

where Z is the vertical distance from the to-be-measured object to the line connecting the centers of the first camera and the second camera; $H_1 = h_1/a$, where $h_1$ is the focal length of the first camera, and a is the size constant of a single pixel; $D_1$ is the distance between the center of the first camera and the center of the second camera; $X_1$ is the location offset component of the to-be-measured object in the first image; and $X_2$ is the location offset component of the to-be-measured object in the second image.

Optionally, the terminal in this embodiment of the present invention further includes: a compression unit 400, configured to: compress imaging data of the first image and the total location offset, and store the imaging data of the first image and the total location offset that are compressed as an image file; a parsing unit 500, configured to parse the image file, so as to obtain the imaging data of the first image and the total location offset; a decoding unit 600, configured to decode the imaging data, so as to display the first image on a screen of the terminal; and a notification unit 700, configured to: display, on the screen of the terminal, a distance result obtained by means of calculation; or notify, by means of voice, a user of a distance result obtained by means of calculation.

It should be noted that the foregoing obtaining unit 100, comparison unit 200, calculation unit 300, compression unit 400, parsing unit 500, decoding unit 600, and notification unit 700 may exist independently, or may be disposed in an integrated manner. In this embodiment, the obtaining unit 100, the comparison unit 200, the calculation unit 300, the compression unit 400, the parsing unit 500, the decoding unit 600, or the notification unit 700 may be disposed independently of a processor of a terminal in a hardware form, and the disposal form may be a microprocessor form;

may be built in the processor of the terminal in the hardware form; or may be stored in a memory of the terminal in a software form, so that the processor of the terminal invokes and executes operations corresponding to the foregoing obtaining unit 100, comparison unit 200, calculation unit 300, compression unit 400, parsing unit 500, decoding unit 600, and notification unit 700.

For example, in the first embodiment of the terminal according to the present invention (the embodiment shown in FIG. 3), the calculation unit 300 may be a processor of the terminal; and functions of the obtaining unit 100 and the comparison unit 200 may be built in the processor, may be disposed independently of the processor, or may be stored in the processor in a software form, so that the processor invokes and implements the functions of the obtaining unit 100 and the comparison unit 200. This is not limited in the embodiment of the present invention. The foregoing processor may be a central processing unit (CPU), a microprocessor, a single-chip microcomputer, or the like.

Figure 5:
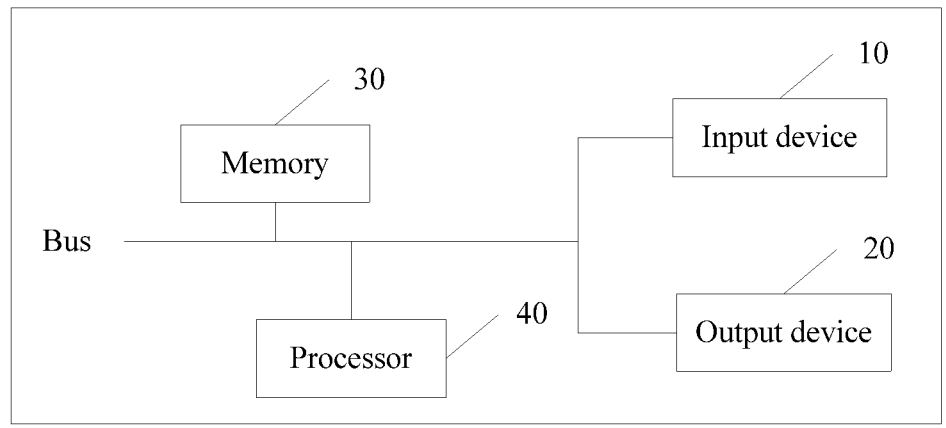
FIG. 5 is a schematic diagram of composition of a third embodiment of a terminal according to the present invention.

Referring to FIG. 5, FIG. 5 is a schematic diagram of composition of a third embodiment of a terminal according to the present invention. In this embodiment, the terminal includes: an input device 10, an output device 20, a memory 30, and a processor 40, where the input device 10 includes a first camera and a second camera, configured to obtain images of a to-be-measured object; the input device 10, the output device 20, the memory 30, and the processor 40 are connected to a bus, where the memory 30 stores a set of program code; and the processor 40 is configured to invoke the program code stored in the memory 30 to perform the following operations: obtaining, by using the first camera, a first image that includes the to-be-measured object, and obtaining, by using the second camera, a second image that includes the to-be-measured object, where the first camera and the second camera are disposed in a same plane; comparing locations of the to-be-measured object in the first image and in the second image, so as to obtain a total location offset of the to-be-measured object, where the total location offset is used to represent an offset of the location of the to-be-measured object in the first image relative to the location of the to-be-measured object in the second image; and the total location offset may be obtained by means of calculation according to a location offset component of the to-be-measured object in the first image and a location offset component of the to-be-measured object in the second image, where either of the location offset components is a distance from a location of the to-be-measured object in a corresponding image to a center line of the image, and the center line of the image is perpendicular to a line connecting a center of the first camera and a center of the second camera; and receiving a measurement point selection instruction entered by a user based on the first image, and calculating a distance between selected measurement points according to the total location offset, a distance between the center of the first camera and the center of the second camera, and a focal length of the first camera.

Optionally, the processor 40 is further configured to: after the obtaining a total location offset of the to-be-measured object, compress imaging data of the first image and the total location offset, and store the imaging data of the first image and the total location offset that are compressed as an image file; before the receiving a measurement point selection instruction entered by a user based on the first image, parse the image file, so as to obtain the imaging data of the first image and the total location offset; and decode the imaging data, so as to display the first image on a screen of the terminal.

The output device 20 is configured to: after the calculating a distance between selected measurement points, display, on the screen of the terminal, a distance result obtained by means of calculation; or notify, by means of voice, a user of a distance result obtained by means of calculation.

Optionally, the processor 40 is specifically configured to compare the locations of the to-be-measured object in the first image and in the second image by using the following formula, so as to obtain the total location offset of the to-be-measured object:

$$D = X_1 + X_2,$$

where D is the total location offset of the to-be-measured object; $X_1$ is the location offset component of the to-be-measured object in the first image; and $X_2$ is the location offset component of the to-be-measured object in the second image.

Optionally, the processor 40 is further specifically configured to calculate the distance between the selected measurement points by using the following formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

where L is the distance between the selected measurement points; $(X_p, Y_p)$ are coordinates of a measurement point p in the first image; $D_p$ is a total location offset of the measurement point p; $(X_q, Y_q)$ are coordinates of a measurement point q in the first image; $D_q$ is a total location offset of the measurement point q; and $H_1 = h_1/a$, where $h_1$ is the focal length of the first camera, and a is a size constant of a single pixel.

Optionally, the processor 40 is further configured to calculate a vertical distance from the to-be-measured object to a line connecting the centers of the first camera and the second camera by using the following formula:

$$Z = H_1 * D_1 / (X_1 + X_2),$$

where Z is the vertical distance from the to-be-measured object to the line connecting the centers of the first camera and the second camera; $H_1 = h_1/a$, where $h_1$ is the focal length of the first camera, and a is the size constant of a single pixel; $D_1$ is the distance between the center of the first camera and the center of the second camera; $X_1$ is the location offset component of the to-be-measured object in the first image; and $X_2$ is the location offset component of the to-be-measured object in the second image.

It should be noted that embodiments in this specification are all described in a progressive manner, and each embodiment focuses on a difference from other embodiments; for same or similar parts in the embodiments, refer to these embodiments. Apparatus embodiments are basically similar to the method embodiments, and therefore the apparatus embodiments are described briefly. For related parts, refer to the descriptions in the method embodiments.

According to the description of the foregoing embodiments, the present invention has the following advantages.

A first image and a second image that are of a to-be-measured object are obtained by using two cameras, and a total location offset of the to-be-measured object is obtained by means of comparison and calculation. When selecting measurement points between which a distance is to be measured, a user may obtain the distance between the selected measurement points by means of calculation according to the total location offset, a distance between a center of the first camera and a center of the second camera, and a focal length of the first camera. To measure a size of the to-be-measured object, the user does not need to carry any extra measurement tool, and only needs to carry a terminal for photographing, thereby enriching functions of a terminal, and enhancing practicability and convenience of the terminal.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read only memory (ROM), a random access memory (RAM), a magnetic disk, or an optical disc.

The measurement method and the terminal provided in the embodiments of the present invention are described in detail above. The principle and implementation manners of the present invention are described herein by using specific examples. The description above about the embodiments is merely provided to help understand the method and core ideas of the present invention. In addition, persons of ordinary skill in the art can make variations and modifications to the present invention in terms of the specific implementation manners and application scopes according to the ideas of the present invention. Therefore, the content of specification shall not be construed as a limit to the present invention.

What is claimed is:

1. A method, comprising:
    obtaining, by a terminal using a first camera, a first image that comprises a to-be-measured object;
    obtaining, by the terminal using a second camera, a second image that comprises the to-be-measured object, wherein the first camera and the second camera are disposed in a same plane;
    receiving, by the terminal, a measurement point selection instruction entered by a user based on the first image;
    determining, by the terminal, selected measurement points in accordance with the measurement point selection instruction;
    comparing, by the terminal, a first location of the to-be-measured object in the first image and a second location of the to-be-measured object in the second image, to obtain a total location offset of the to-be-measured object, wherein the total location offset is determined based on a sum of a first location offset of the first location in the first image and a second location offset of the first location in the second image, the first location corresponding to one of the selected measurement points; and
    calculating, by the terminal, a distance between the selected measurement points according to the total location offset, according to a distance between a center of the first camera and a center of the second camera, and according to a focal length of the first camera.

2. The method according to claim 1, wherein the method further comprises:
    compressing imaging data of the first image and the total location offset as an image file;
    storing the imaging data of the first image and the total location offset that are compressed as the image file, after comparing the first location of the to-be-measured object in the first image and the second location of the to-be-measured object in the second image;
    parsing the image file, to obtain the imaging data of the first image and the total location offset; and
    decoding the imaging data, to display the first image on a screen of the terminal, before receiving the measurement point selection instruction.

3. The method according to claim 1, wherein the method further comprises:
    displaying, on a screen of the terminal, a distance result obtained by calculation, after calculating the distance between the selected measurement points.

4. The method according to claim 1, wherein the method further comprises:
    notifying, by voice, the user, of a distance result obtained by calculation, after calculating the distance between the selected measurement points.

5. The method according to claim 1, wherein comparing the first location of the to-be-measured object in the first image and the second location of the to-be-measured object in the second image is performed using the formula:

$$D = X_1 + X_2,$$

wherein D is the total location offset of the to-be-measured object, $X_1$ is the first location offset, and $X_2$ is the second location offset.

6. The method according to claim 1, wherein calculating the distance between the selected measurement points is performed using the formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

wherein L is the distance between the selected measurement points, $(X_p, Y_p)$ are coordinates of a measurement point p in the first image, $D_p$ is a total location offset of the measurement point p, $(X_q, Y_q)$ are coordinates of a measurement point q in the first image, $D_q$ is a total location offset of the measurement point q; and $H_1 = h_1/a$, wherein $h_1$ is the focal length of the first camera and a is a size constant of a single pixel, wherein $D_1$ is the distance between the center of the first camera and the center of the second camera, and wherein one of the $D_p$ or $D_q$ is the total location offset.

7. The method according to claim 1, wherein the method further comprises:
    calculating a vertical distance from the to-be-measured object to a line connecting the center of the first camera and the center of the second camera by using the formula:

$$Z = H_1 * D_1/(X_1 + X_2),$$

wherein Z is the vertical distance from the to-be-measured object to the line connecting the center of the first camera and the center of the second camera, $H_1 = h_1/a$, wherein $h_1$ is the focal length of the first camera and a is a size constant of a single pixel, $D_1$ is the distance between the center of the first camera and the center of the second camera, $X_1$ is the first location offset, and $X_2$ is the second location offset.

8. The method according to claim 1, wherein the method comprises:
    calculating a distance between two measurement points in response to the user selecting the two measurement points; and successively calculating distances between every two neighboring measurement points according to a selection order, in response to the user selecting more than two measurement points.

9. A terminal, comprising:
an input device comprising a first camera and a second camera, wherein the first camera and the second camera are disposed in a same plane, and wherein the first camera and the second camera are configured to obtain images of a to-be-measured object;
an output device;
a processor coupled to the input device and to the output device; and
a non-transitory computer readable storage medium storing a program for execution by the processor, the program including instructions to:
obtain, using the first camera, a first image that comprises the to-be-measured object;
obtain, using the second camera, a second image that comprises the to-be-measured object;
receive a measurement point selection instruction entered by a user based on the first image;
determine selected measurement points in accordance with the measurement point selection instruction;
compare a first location of the to-be-measured object in the first image and a second location of the to-be-measured object in the second image, to obtain a total location offset of the to-be-measured object, wherein the total location offset is determined based on a sum of a first location offset of the first location in the first image and a second location offset of the first location in the second image, the first location corresponding to one of the selected measurement points; and
calculate a distance between the selected measurement points according to the total location offset, according to a distance between a center of the first camera and a center of the second camera, and according to a focal length of the first camera.

10. The terminal according to claim 9, wherein the instructions further comprise instructions to:
compress imaging data of the first image and the total location offset as an image file, after obtaining the total location offset of the to-be-measured object;
store the imaging data of the first image and the total location offset that are compressed as the image file;
parse the image file, to obtain the imaging data of the first image and the total location offset; and
decode the imaging data, to display the first image on a screen of the terminal, before receiving the measurement point selection instruction entered by the user.

11. The terminal according to claim 9, wherein the output device is a screen, and wherein the screen is configured to:
display a distance result obtained by calculation, after calculating the distance between the selected measurement points.

12. The terminal according to claim 9, wherein the output device is configured to:
notify, by voice, the user, of a distance result obtained by calculation, after calculating the distance between the selected measurement points.

13. The terminal according to claim 9, wherein the instructions to compare the first location of the to-be-measured object in the first image and the second location of the to-be-measured object in the second image using the formula:

$$D = X_1 + X_2,$$

wherein D is the total location offset of the to-be-measured object, $X_1$ is the first location offset, and $X_2$ is the second location offset.

14. The terminal according to claim 9, wherein the instructions further comprise instructions to:
calculate the distance between the selected measurement points by using the formula:

$$L = D_1 * \sqrt{\left(\frac{X_p}{D_p} - \frac{X_q}{D_q}\right)^2 + \left(\frac{Y_p}{D_p} - \frac{Y_q}{D_q}\right)^2 + \left(\frac{H_1}{D_p} - \frac{H_1}{D_q}\right)^2},$$

wherein L is the distance between the selected measurement points, $(X_p, Y_p)$ are coordinates of a measurement point p in the first image, $D_p$ is a total location offset of the measurement point p, $(X_q, Y_q)$ are coordinates of a measurement point q in the first image, $D_q$ is a total location offset of the measurement point q, and $H_1 = h_1/a$, wherein $h_1$ is the focal length of the first camera and a is a size constant of a single pixel, and wherein $D_1$ is the distance between the center of the first camera and the center of the second camera, and wherein one of the $D_p$ or $D_q$ is the total location offset.

15. The terminal according to claim 9, wherein the instructions further comprise instructions to:
calculate a vertical distance from the to-be-measured object to a line connecting the center of the first camera and the center of the second camera using the formula:

$$Z = H_1 * D_1 / (X_1 + X_2),$$

wherein Z is the vertical distance from the to-be-measured object to the line connecting the center of the first camera and the center of the second camera, $H_1 = h_1/a$, wherein $h_1$ is the focal length of the first camera and a is a size constant of a single pixel, $D_1$ is the distance between the center of the first camera and the center of the second camera, $X_1$ is the first location offset, and $X_2$ is the second location offset.

16. The terminal according to claim 9, wherein the instructions to calculate the distance between the selected measurement points comprise instructions to:
calculate a distance between two measurement points, in response to the user selecting the two measurement points; and
successively calculate distances between every two neighboring measurement points according to a selection order, in response to a user selecting more than two measurement points.

17. A non-transitory computer readable medium storing a program for execution by a processor of a terminal, the program including instructions for:
obtaining, using a first camera, a first image that comprises a to-be-measured object;
obtaining, using a second camera, a second image that comprises the to-be-measured object, wherein the first camera and the second camera are disposed in a same plane;
receiving a measurement point selection instruction entered by a user based on the first image;
determining selected measurement points in accordance with the measurement point selection instruction;
comparing a first location of the to-be-measured object in the first image and a second location of the to-be-measured object in the second image, to obtain a total location offset of the to-be-measured object, wherein the total location offset is determined based on a sum of a first location offset of the first location in the first image and a second location offset of the first location in the second image, the first location corresponding to one of the selected measurement points; and
calculating a distance between the selected measurement points according to the total location offset, according to a distance between a center of the first camera and a center of the second camera, and according to a focal length of the first camera.

* * * * *